United States Patent
Senshu

[11] Patent Number: 6,058,099
[45] Date of Patent: *May 2, 2000

[54] DISC-SHAPED INFORMATION RECORDING MEDIUM HAVING OFFSET ADDRESS INFORMATION DATA

[75] Inventor: Susumu Senshu, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,433

[22] Filed: Dec. 27, 1996

[30] Foreign Application Priority Data

Dec. 29, 1995  [JP]  Japan ................................. 7-352608

[51] Int. Cl.⁷ ................................................ G11B 7/24
[52] U.S. Cl. ........................... 369/275.3; 369/54; 369/58
[58] Field of Search ............................. 369/44.26, 44.79, 369/54, 58, 275.3, 275.4, 275.1, 47, 48

[56] References Cited

U.S. PATENT DOCUMENTS

| | | | |
|---|---|---|---|
| 5,210,738 | 5/1993 | Iwata et al. | 369/275.1 |
| 5,418,768 | 5/1995 | Senshu | 369/59 |
| 5,444,682 | 8/1995 | Yamada et al. | 369/44.26 |
| 5,463,614 | 10/1995 | Morita | 369/275.4 |
| 5,493,552 | 2/1996 | Kobori | 369/275.4 |
| 5,508,995 | 4/1996 | Moriya et al. | 369/275.4 |
| 5,537,373 | 7/1996 | Horikiri | 369/44.13 |
| 5,539,724 | 7/1996 | Ohtomo | 369/275.4 |
| 5,566,141 | 10/1996 | Yamaguchi et al. | 369/44.28 |
| 5,604,726 | 2/1997 | Karube | 369/275.4 |
| 5,615,205 | 3/1997 | Belser | 369/275.4 |
| 5,671,164 | 9/1997 | Kanno et al. | 364/569 |
| 5,708,649 | 1/1998 | Kamoto et al. | 369/275.3 |
| 5,715,217 | 2/1998 | Fuji | 369/44.26 |

FOREIGN PATENT DOCUMENTS 7141701  6/1995  Japan .

*Primary Examiner*—Thang V. Tran
*Attorney, Agent, or Firm*—Limbach & Limbach L.L.P.

[57] ABSTRACT

A disc-shaped information recording medium in which the recording density can be increased to secure a large storage capacity and in which there is no risk of an address section being mistakenly detected by cross-talk from a neighboring track, is disclosed. Specifically, an optical disc of a continuous servo system in which tracking is controlled using a pre-groove and in which information is recorded and/or reproduced with constant angular velocity using clocks of a sole frequency, is disclosed. On the disc is formed a spiral a track made up of a data portion for recording data and an address section for recording management information for recording/reproducing data. Both a groove and a land are used as a recording/reproducing track. Odd tracks are formed on the land, while even tracks are formed on the groove.

6 Claims, 11 Drawing Sheets

DISC-SHAPED INFORMATION RECORDING MEDIUM HAVING OFFSET ADDRESS INFORMATION DATA

BACKGROUND OF THE INVENTION

1. Field of the Invention

This invention relates to a disc-shaped information recording medium for optically recording/reproducing the information, such as an optical disc.

2. Description of the Related Art

Among optical disc systems in which a recording/reproducing track on a recording surface is scanned by a laser beam for recording/reproducing various data, there are a CLV system in which the optical disc is rotated at a constant linear velocity for recording/reproducing data, a CAV system in which the optical disc is rotated at a constant angular velocity for recording/reproducing data, and a MCAV system (modified CAV system) in which the spatial recording density is set so as to be substantially equal in both the inner and outer rims of the disc for increasing the recording density.

Heretofore, in the optical disc, either a land or a groove, formed concentrically or spirally on the recording surface, is used as a recording/reproducing track. In general, a spirally formed land is used as the recording/reproducing track TR.

There is also known a continuous servo system in which a pre-groove continuously formed along the track is used for tracking control, or a sampled servo system in which servo areas discretely formed on the track are utilized for tracking control. With the continuous servo system, the land is tracked using an optical phase difference between the land and the groove for recording/reproducing the information on or from the land, that is the recording/reproducing track.

On the recording/reproducing track, an address section is formed for recording management information for data recording/reproduction.

FIG. 2 shows the structure of an address section of an optical disc of the continuous servo system prescribed by ISO (International Organization for Standardization).

In the structure of the address section, shown in FIG. 2, VFO denotes a clock seizing signal containing a large quantity of the phase information for locking the PLL (phase locked loop) of the clock reproducing system for extracting clocks for reproducing address information, AM denotes synchronization signals for taking the timing for reproducing the address information and ID denotes the actual address information containing the error correction codes. The address section may be comprised of a plurality of sets of the above signals. In the example of FIG. 2, the above sets of signals are recorded in triplicates. The address section may be preceded by a signal SM specifying the leading end of the section.

Among known optical discs, there are a so-called ROM disc, dedicated to reproduction, a recordable RAM disc, such as a write-once disc or a magneto-optical disc, and a so-called hybrid disc having both a ROM area and a RAM area.

If, for the purpose of increasing disc capacity, the track pitch is reduced for increasing the density in the radial direction, the problem of cross-talk between tracks arises. In particular, embossed pits formed by pre-formatting seriously affect neighboring tracks.

SUMMARY OF THE INVENTION

It is therefore an object of the present invention to provide a disc-shaped information recording medium in which there is no risk of mistaken detection of an address section due to cross-talk from neighboring tracks.

It is another object of the present invention to provide a disc-shaped information recording medium in which the recording density is increased for securing a larger recording capacity.

It is still another object of the present invention to provide a disc-shaped information recording medium in which land and the groove are used as tracks for securing track continuity.

It is yet another object of the present invention to provide a disc-shaped information recording medium in which address reproduction or switching of tracking polarity in the playback system may be facilitated by the synchronization signals with different patterns being recorded on the address sections of the odd tracks and on those of the even tracks.

According to the present invention, there is provided an optical disc having a land and a groove, in which the information is recorded and/or reproduced on or from a track on the land and the groove. The optical disc has an address section having a group of address information data previously formed at a pre-set period on the track. The group of address information is arranged with an offset in the track direction in an ordered pattern.

Preferably, the land is switched to the groove or vice versa an odd number of times per turn on a track.

Preferably, the address section is arranged at switching positions from the land to the grove or vice versa.

According to the present invention, there is also provided an optical disc having a land, in which the information is recorded and/or reproduced on or from the track on a land and the groove.

The land is switched to the groove or vice versa an odd number of times per turn on a track and the switching positions are aligned in the radial direction in one or more radial zones. The address section is arranged at switching positions from the land to the groove or vice versa. The address section has a first address information section and a second address information section, the first and second address information sections being at a pre-set distance from one another in the zone and offset in the radial direction.

According to the present invention, there is also provided an optical disc device for recording and/or reproducing information on or from a land and a groove on an optical disc. The optical disc device includes an optical head for recording and/or reproducing the information on or from the optical disc, means for detecting the address information formed at a pre-set period on the optical disc based on a signal from the optical head, means for applying a tracking servo to the optical head, and means for issuing a signal for switching the tracking polarity to the tracking servo means based on the signal from the address information detection means.

DESCRIPTION OF THE PREFERRED EMBODIMENTS

Figure 1:
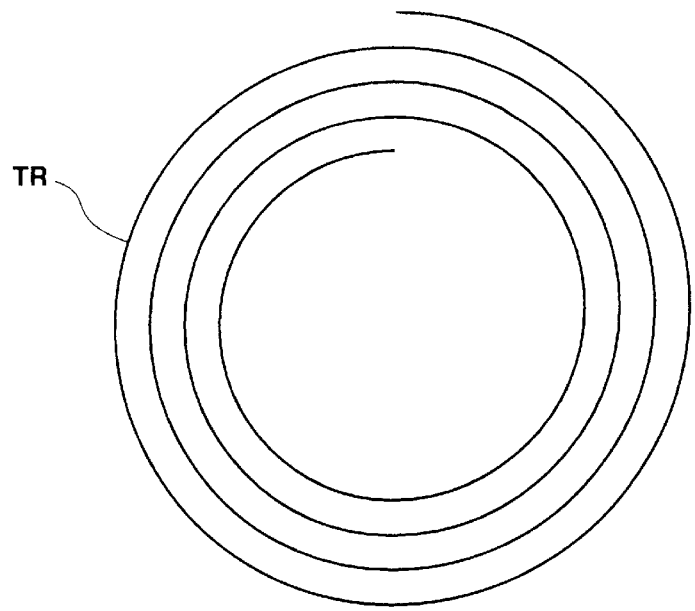
FIG. 1 shows a recording/reproducing track in a customary optical disc.
Figure 2:
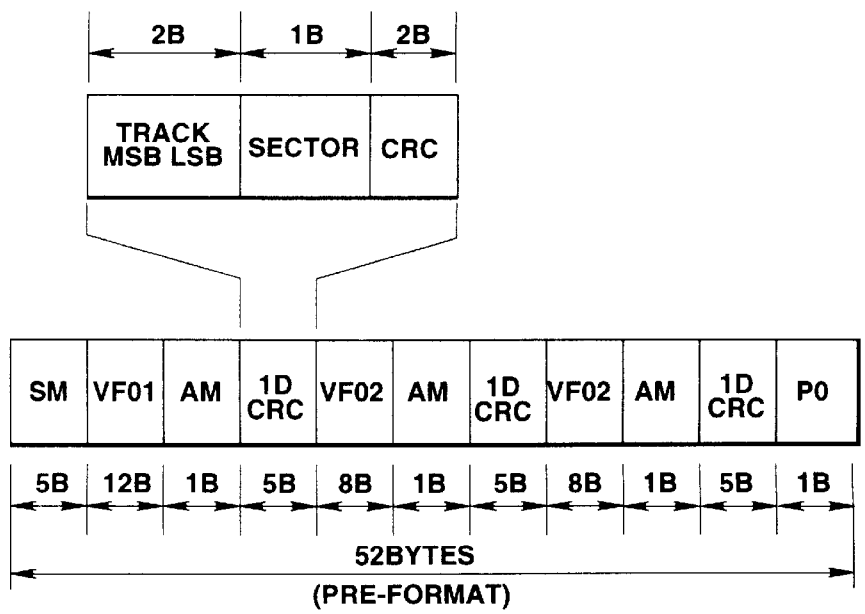
FIG. 2 schematically shows the structure of an address section of the optical disc of the continuous servo system prescribed by ISO.

Referring to the drawings, preferred embodiments of the present invention will be explained in detail.

Figure 3:
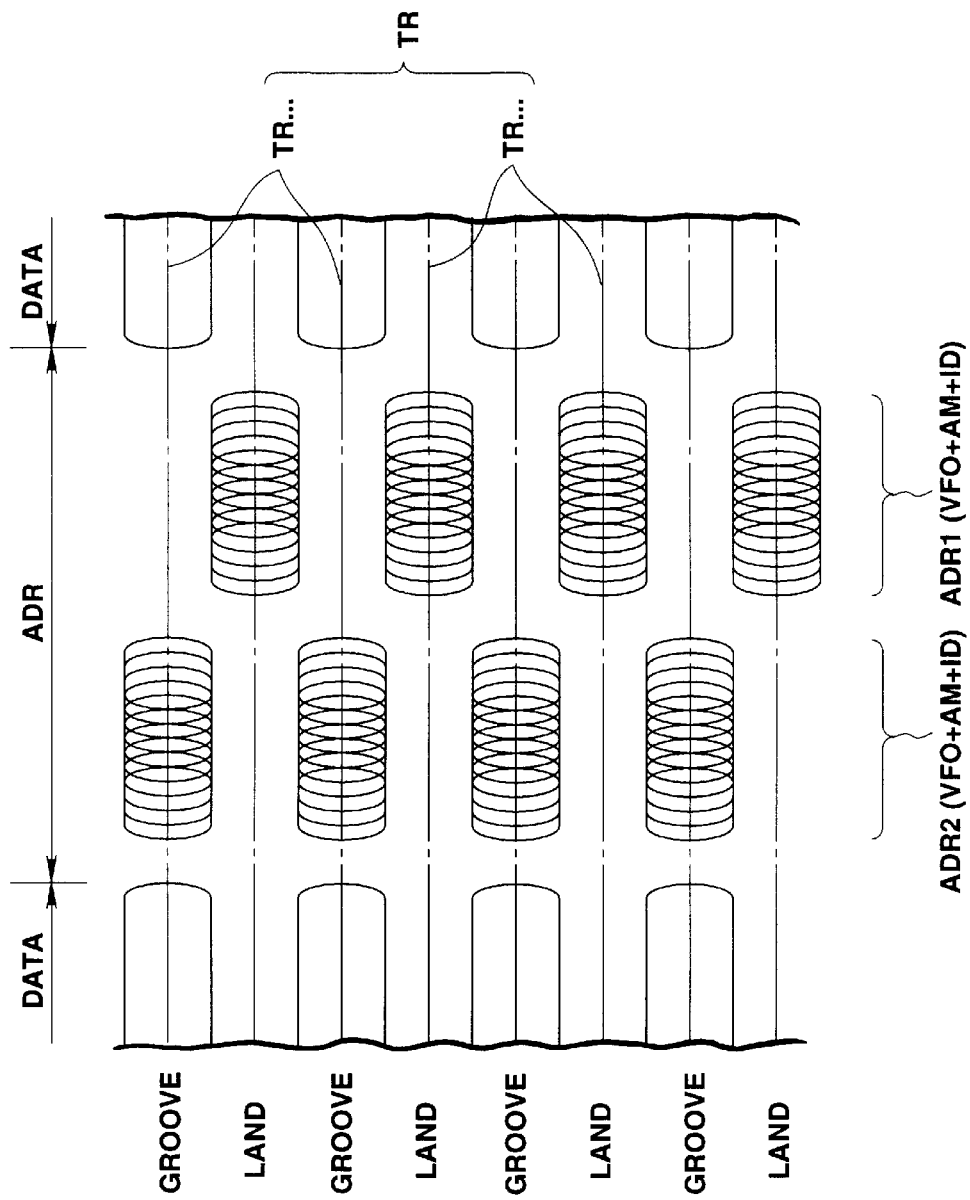
FIG. 3 is a schematic plan view showing an essential structure of a disc-shaped information recording medium according to the present invention.

A disc-shaped information recording medium according to the present invention is configured as shown for example in FIG. 3. The disc-shaped information recording medium, shown in FIG. 3, is an optical disc having a pre-groove for tracking control. On the recording medium are formed at pre-set periods, in a spiral pattern, data sections DATA for recording data and address sections ADR for recording data recording/reproducing management information. In the present disc-shaped information recording medium, both the grooves and the lands are used as recording/reproducing tracks TR. For example, odd tracks $TR_{odd}$ and even tracks $TR_{even}$ are formed on the lands and the grooves, respectively. With this disc-shaped information recording medium, an optical disc of an increased capacity is realized by employing both the grooves and the lands as the recording/reproducing tracks TR.

With the present disc-shaped information recording medium, the address sections ADR1 associated with the odd tracks $TR_{odd}$ and the address sections ADR2 associated with the even tracks $TR_{even}$ are formed at circumferentially offset positions.

In the address sections ADR1, ADR2, there are recorded a clock seizing signal VFO containing a large quantity of phase information for locking the PLL (phase locked loop) of the clock reproducing system for extracting clocks for reproducing the address information, synchronization signals AM for taking the timing for reproducing the address information and the actual address information containing error correction codes ID, in the form of embossed pits by pre-formatting.

In usual modulation systems, pits of the address sections of neighboring tracks assume various values and hence detection errors are possible due to cross-talk. However, by arraying the address section ADR1 associated with the odd tracks $TR_{odd}$ and the address section ADR2 associated with the even tracks $TR_{even}$ in circumferentially offset positions, there is no risk of mistaken detection due to cross-talk.

Figure 4:
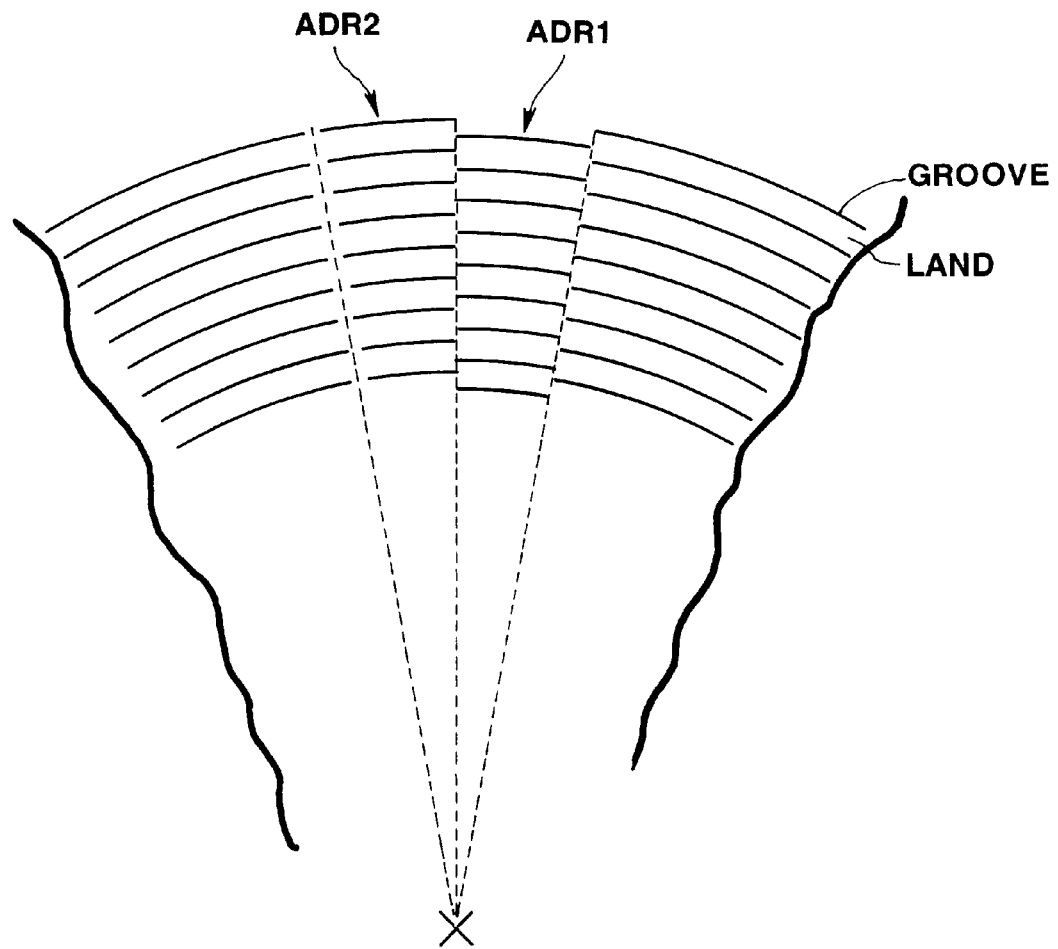
FIG. 4 is a schematic plan view showing the disposition of the address sections on the odd tacks and those on the even tracks in the disc-shaped information recording medium shown in FIG. 3.

In the above example, the address section ADR1 associated with the odd tracks $TR_{odd}$ and the address section ADR2 associated with the even tracks $TR_{even}$ are arrayed in circumferentially offset positions and, as shown in FIG. 4, the address sections ADR in their entirety are aligned in the radial direction. However, the address sections ADR1 and ADR2 need not necessarily be adjacent to each other.

Figure 5:
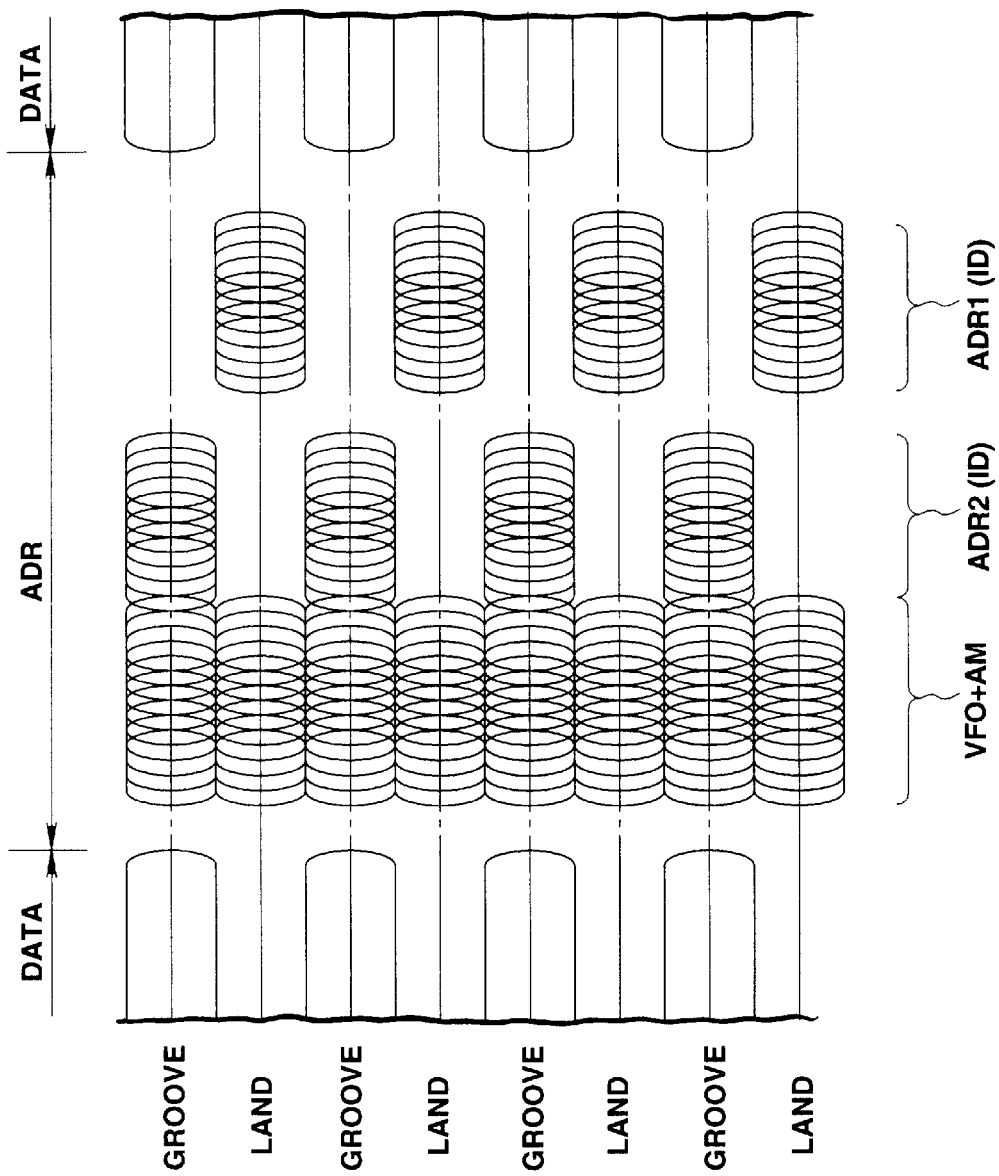
FIG. 5 illustrates an example of recording contents of the address sections.
Figure 6:
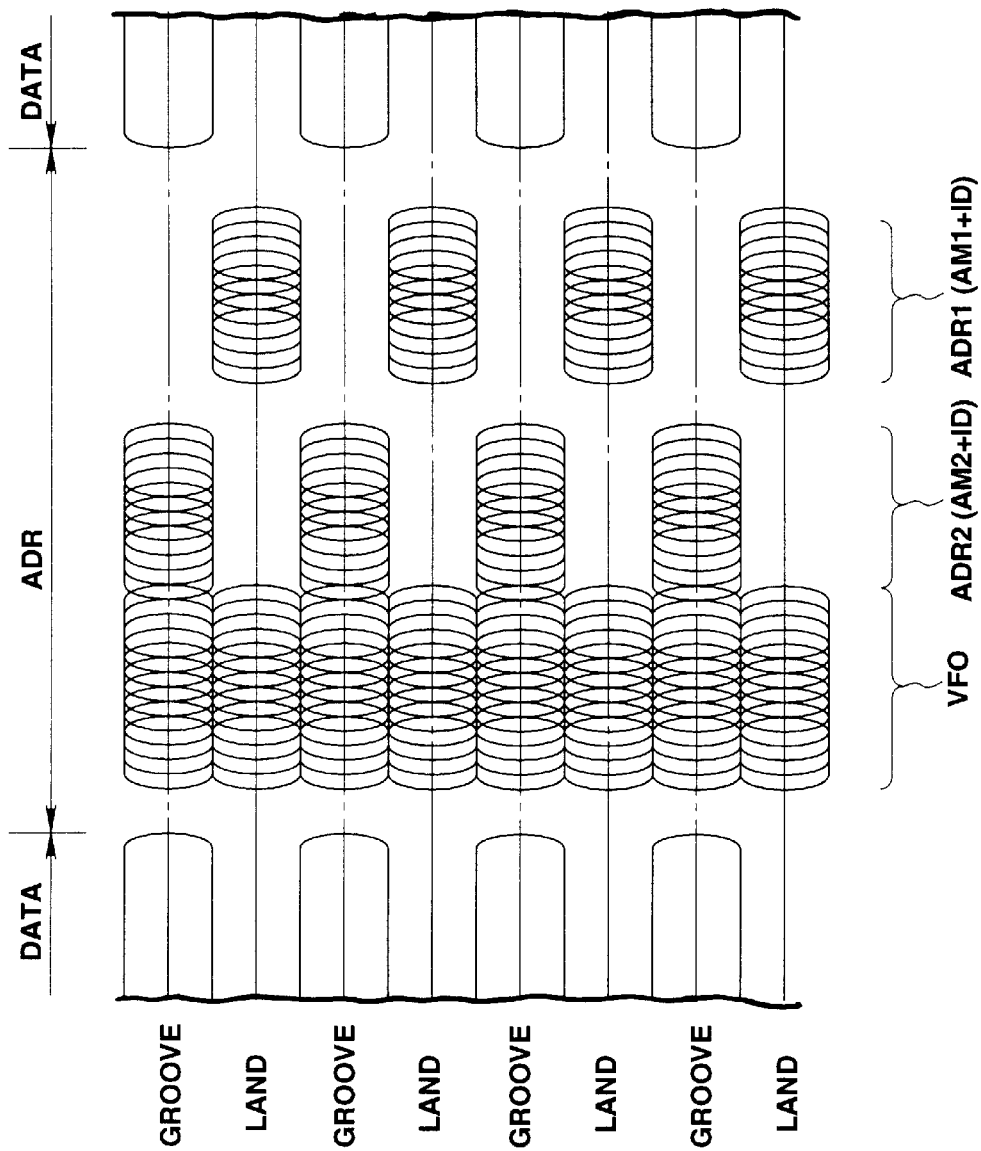
FIG. 6 illustrates another example of recording contents of the address sections.

It is also possible to array the address section ADR1 associated with the odd tracks $TR_{odd}$ and the address section ADR2 associated with the even tracks $TR_{even}$ so that the same signals not affected by cross-talk between neighboring tracks, such as the clock seizing signals VFO or synchronization signals AM, are aligned in the radial direction, while signals assuming different values from track to track, such as the address information $ID_{odd}$ or $ID_{even}$, are not aligned in the radial direction for avoiding the effect of cross-talk, but are offset in the circumferential direction, as shown in FIG. 5.

It is also possible to array the clock seizing signal VFO in the radial direction and to record the address information $ID_{odd}$ or $ID_{even}$, assuming different values from track to track, with offset in the track direction, along with the synchronization signals $AM_{odd}$ and $AM_{even}$. The synchronization signals $AM_{odd}$ and $AM_{even}$ may also be of different patterns from each other.

Figure 7:
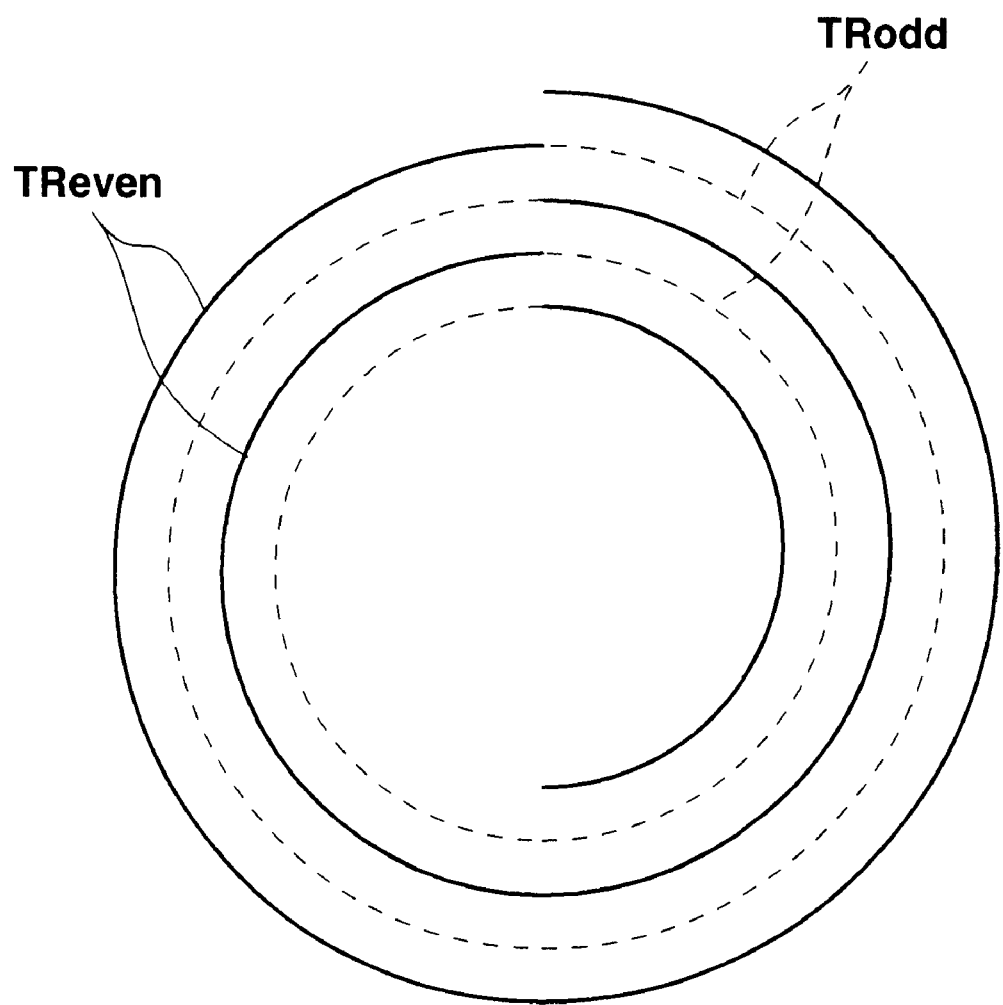
FIG. 7 illustrates interchanged grooves and lands of a disc-shaped information recording medium in which the grooves and lands are interchanged once each track turn to give a recording/reproducing track.
Figure 8:
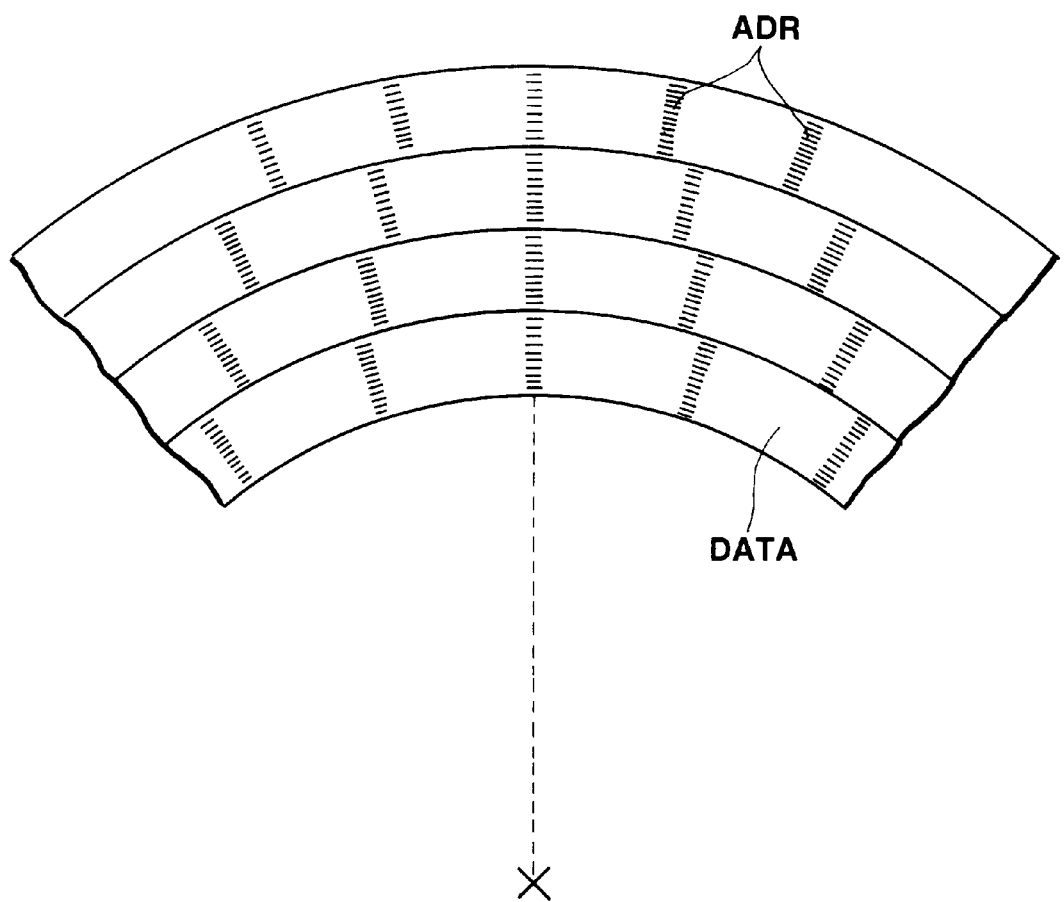
FIG. 8 illustrates a disc-shaped information recording medium in which the grooves and lands are interchanged once each track turn to give a recording/reproducing track.

Also, in the disc-shaped information recording medium, in which the grooves and the lands are both used as the recording/reproducing track TR for increasing the recording density, it is possible to interchange the grooves and the lands once each turn of the track at the time of cutting for securing track continuity, as shown in FIGS. 7 and 8. The address section ADR1 may be provided adjacent to the groove at the transition area from the land to the groove, while the address section ADR2 may be provided adjacent to the land at the transition area from the groove to the land. In the odd track $TR_{odd}$ corresponding to transition from the land to the groove, the address information of the address section ADR1 is used, whereas, in the even track $TR_{even}$ corresponding to transition from the groove to the land, the address information of the address section ADR2 is used.

By the synchronization signals $AM_{odd}$ in the address section ADR1 and $AM_{even}$ in the address section ADR2 having different patterns from each other, address reproduction or tracking polarity switching can be done even in the absence of timing management.

Figure 9:
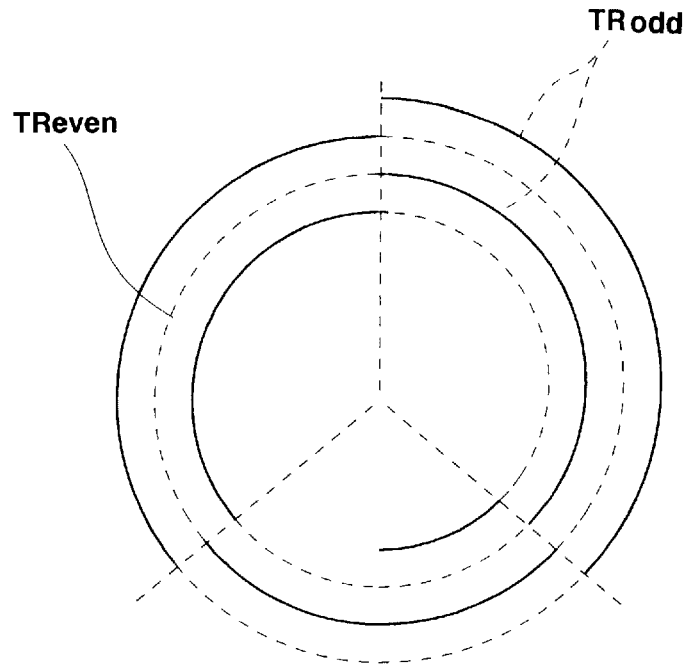
FIG. 9 illustrates a disc-shaped information recording medium in which the grooves and lands are interchanged thrice each track turn to give a recording/reproducing track.

The interchanging of the grooves and the lands need not be done once each track turn, but may also be done an odd number of times, such as thrice as shown in the embodiment of FIG. 9, per each track turn, for securing track continuity.

In the disc-shaped recording medium of the MCAV (modified CAV) system, in which the recording surface is divided into plural zones for maintaining substantially constant spatial recording density between the outer rim and the inner rim of the disc, the number and the position of addresses, the number of times and the position of interchanging between the lands and the grooves, per each track turn, are changed from zone to zone.

In the recording/reproducing system for the disc-shaped recording medium, shown in FIG. 3, it is not allowed to record the information in a mistaken sector or at a mistaken position, or to reproduce the information from an area other than the target area. However, since it is known in advance whether the target sector for recording/reproduction is on the land or on the groove, it suffices if the address section ADR1 or the address section ADR2 is be selectively reproduced depending on whether the target sector is on the land or on the groove. Such an address that cannot be reproduced correctly due to excessive cross-talk need not be reproduced, but only the address section that is required needs to be reproduced.

If tracking is applied to the groove, and the address ADR2 is directly read, tracking information transfers from the on-pit state to the on-groove state, such that the address section ADR2 can be reproduced. Therefore, the address section ADR2 is used as the information. On the other hand, if tracking is applied to the groove, and the address ADR1 is directly read, tracking information transfers from the on-pit state to the on-land state, such that the address section ADR1 cannot be reproduced. The signal from the address section ADR1 is the signal due to cross-talk from both sides and hence is not used.

If address reproduction is done for grasping a current position for seeking the target address, an error on the order of one track cannot raise a problem. Therefore, it suffices to reproduce the signals without becoming conscious of the address sections ADR1 or ADR2 and to use the reproducible address information.

In general, a detection code is contained in the address information. Therefore, error detection is done at the time of address reproduction using the above-mentioned detection code in order to use only the information of the error-free address sections ADR1 and ADR2. If the target track is on the land, incorrect signals are reproduced from the address ADR2 due to cross-talk, while the address section ADR1 is on-track and hence is reproduced correctly. The information of the address section ADR2 is detected for errors by error detection, while the information of the address section ADR1 is detected correctly by error detection. Therefore, the information of the address section ADR1 is used. If precise position information is required, it suffices to apply tracking and reproduce the information. In addition, the address section ADR1 or the address section ADR2 can be selectively reproduced depending on whether the target track is on the land or on the groove.

If tracking is applied to the land, and the address section ADR1 is read, the tracking polarity can be switched for applying tracking to the address pit for reproducing the address section ADR1. The tracking polarity can then be reset for normal data recording/reproduction at the next following data portion DATA.

The recording/reproduction for the data portion DATA on the land is now explained.

Figure 10:
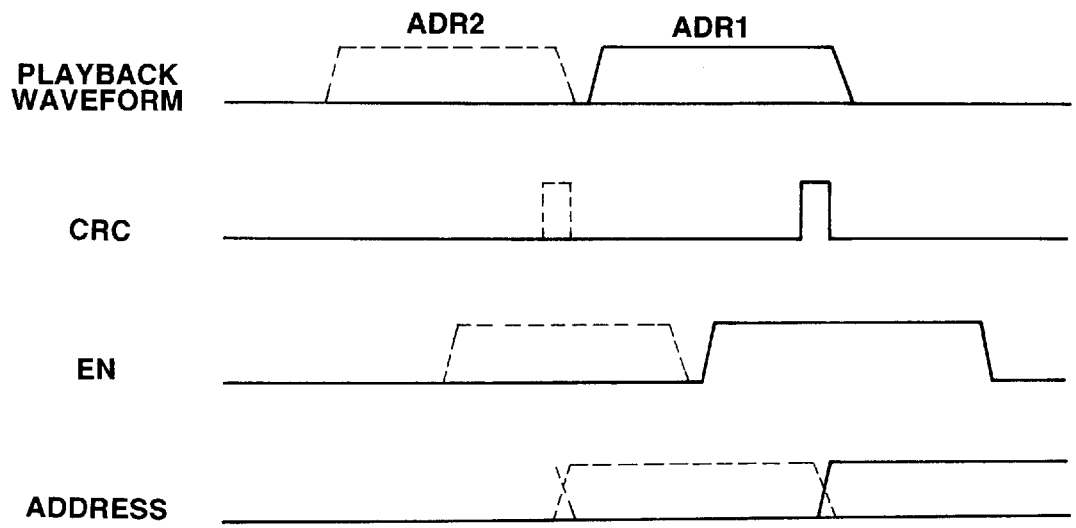
FIG. 10 is a timing chart for illustrating the recording/reproduction for a data portion on the land.

Since tracking is applied on the land, the playback RF signals are as shown in FIG. 10. With the read-only ROM disc, phase-transition optical disc, detecting data based on the difference in the reflected light volume, or with the dye type optical disc, some signals may occasionally be present in the data portion DATA. Also the address information may be leaked into the address section 1 from neighboring tracks due to cross-talk.

CRC is error detection which is performed using the error detection code contained in the address information. The PLL operates in the address section. If the synchronization signal is detected, error detection is carried out as the address information is reproduced. The error detection comes to a close at the end of the address information (CRC=Hi). Therefore, in the data portion DATA, CRC=Hi cannot occur if there is any playback signal. In the address section 2, since correct data cannot be obtained with ease under the effect of the neighboring tracks, the probability that CRC=Hi is low. Since the playback signal of correct data is naturally obtained in the address section ADR1, the relationship CRC=Hi holds.

Figure 11:
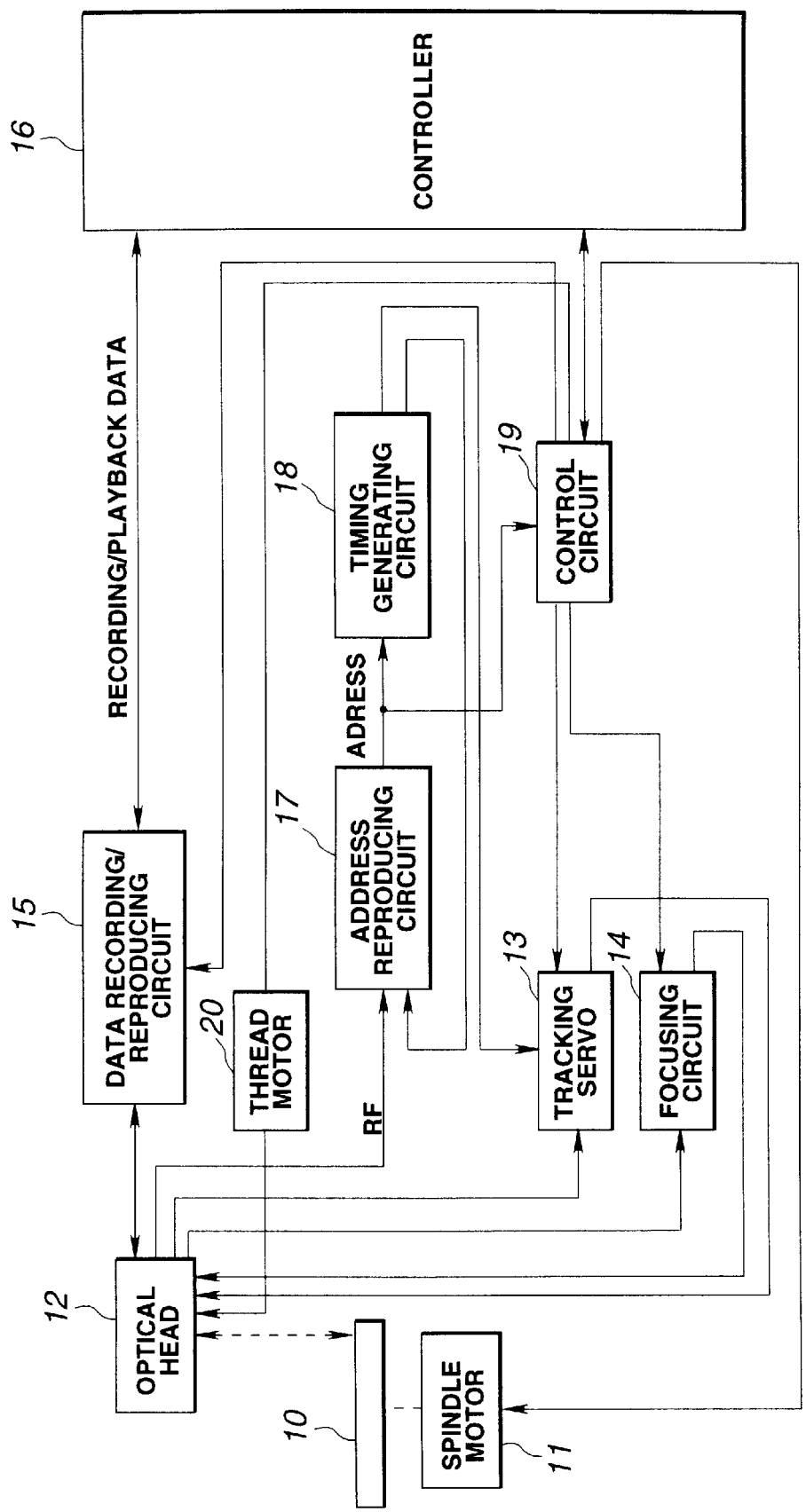
FIG. 11 is a schematic block diagram showing the structure of an apparatus for recording/reproducing of the information on or from the disc-shaped information recording medium according to the present invention.

FIG. 11 shows a typical structure of an optical disc recording/reproducing apparatus for data recording/reproduction for the above-mentioned optical disc 1. A spindle motor 11 runs the disc 1 at a pre-set velocity under control by a control circuit 19.

An optical head 12 radiates laser light on the disc 10 for recording data thereon and for reproducing data from the reflected light.

A tracking servo circuit 13 generates a tracking error signal based on the principle of the push-pull method and drives the optical head 12 depending on the tracking error signal under control by a control circuit 19. A focusing servo circuit 14 generates a focusing error signal based on the principle of the astigmatic method and drives the optical head 12 depending on the focusing error signal under control by a control circuit 19.

A recording/reproducing circuit 15 modulates recording data input from a controller 16 and outputs the modulated output to the optical head 12, while outputting playback data inputted from the optical head 12 to a controller 16.

An address generating circuit 17 reads out the address information from data reproduced by the optical head 12 and outputs the read-out information to a timing generating circuit 18 and to a control circuit 19.

The timing generating circuit 18 is a circuit for taking the timing in a track and is initialized by an address detection signal (address information) from the address generating circuit 17. This initialization enables prediction of, for example, the next address position. In distinction from the address generating circuit, the timing generating circuit 18 is operated with a reference clock. The timing generating circuit 18 outputs a polarity-switching signal to the tracking servo circuit 13.

A thread motor 20 transports the optical head 12 to a target track on the optical disc 10 under control by the control circuit 19.

Figure 12:
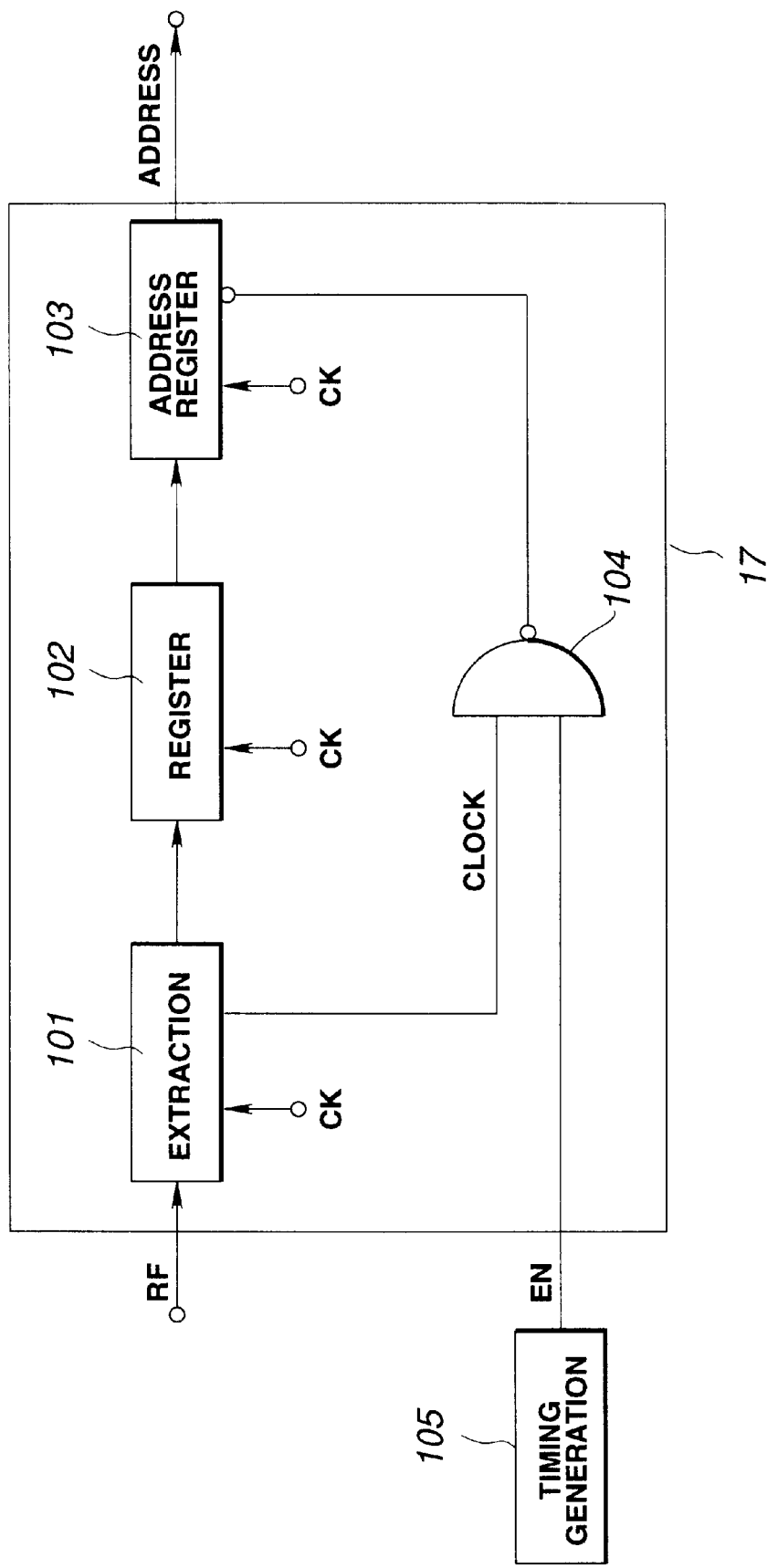
FIG. 12 is a block diagram showing the structure of an address processing circuit.

The block diagram of FIG. 12 shows details of the address generating circuit 17 shown in FIG. 11.

In the address reproducing circuit, shown in the block diagram of FIG. 12, the playback RF signals are routed via extraction circuit 101 to a serial/parallel converting register 102, an output of which is seized by an address register 103.

The extraction circuit 101 extracts the playback RF signals by a seizing signal CRCOK (CRC=Hi) and routes the extracted signal to the serial/parallel converting register 102. The data stored in this register 102 is seized as address information into an address register 103 at CRC=Hi.

The seizing signal CRCOK (CRC=Hi) to the address register 103 is gated via gating circuit 104 controlled by a control signal EN outputted with allowance in the error detection position from a timing generating block 105 for assuring the correctness of the address information seized into the address register 103.

The typical tracking operation during reproduction of the address information is explained.

Figure 13:
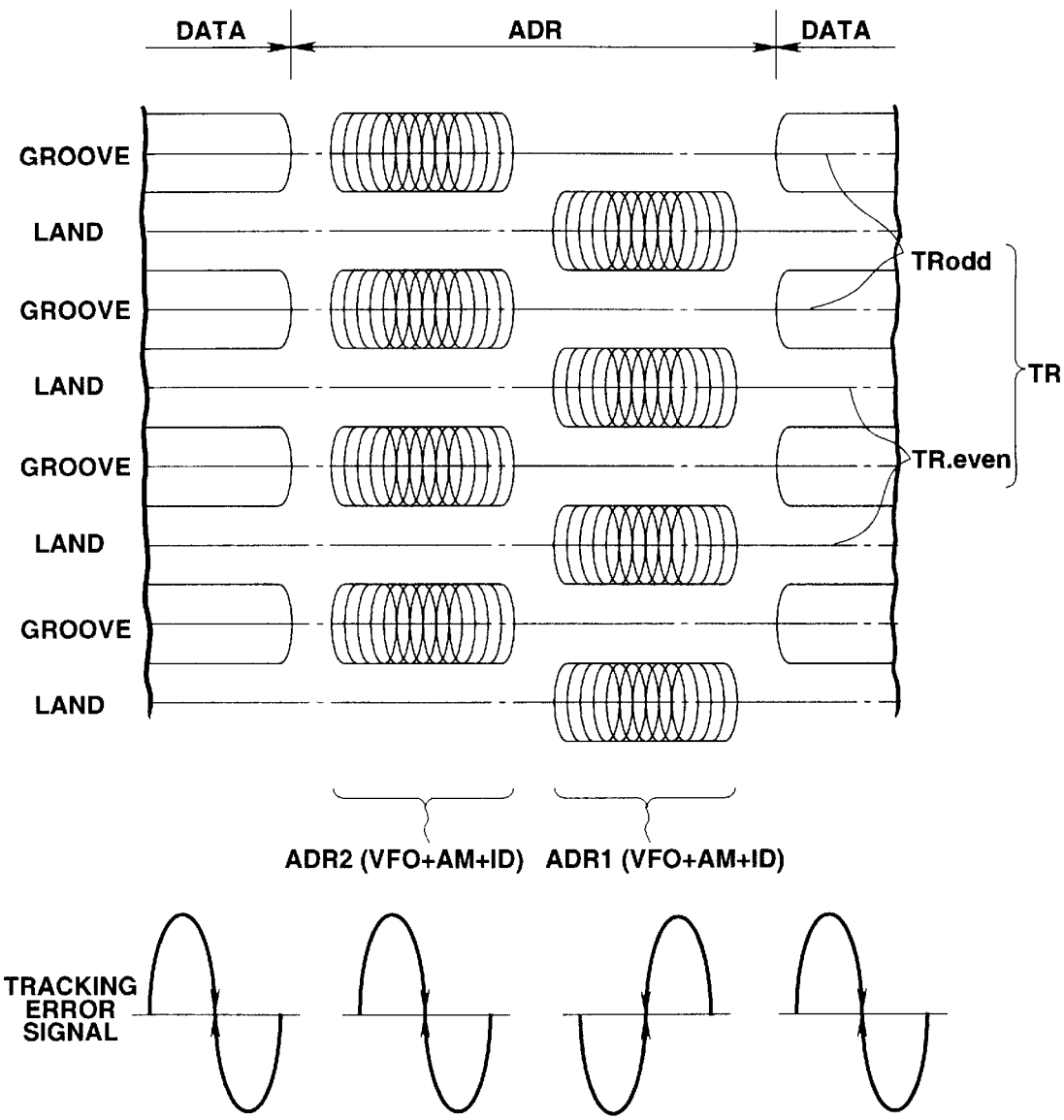
FIG. 13 shows an S-shaped curve corresponding to the locus of movement of a pick-up for recording/reproducing data on the data portion of the land.
Figure 14:
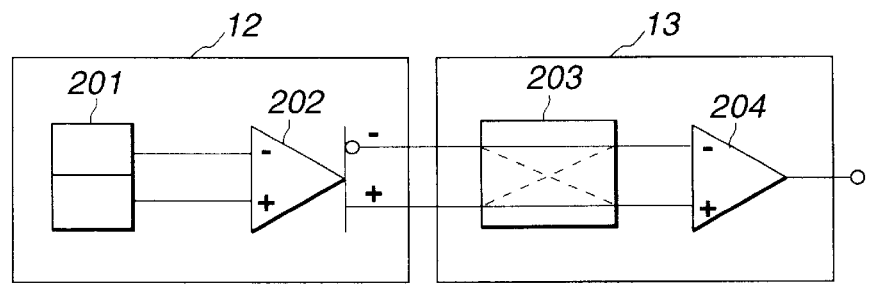
FIG. 14 is a block diagram illustrating a circuit structure for switching the polarity of a tracking drive.

The S-shaped curve of the tracking error signal corresponding to the locus of movement of the optical pickup in case of recording/reproducing data on or from the data portion DATA on the land is inverted between the data portion DATA and the address section ADR1, as shown in FIG. 13. For applying the tracking, it suffices to apply the tracking in timed relation to the zero-crossing of the S-shaped curve. However, the driving direction needs to be reversed in the address section ADR1, the tracking error signal obtained via operational amplifier 202 from a split detector 201 in the optical head 12 is switched in polarity by the polarity switching circuit 23 in the tracking servo circuit 23 so as to be sent to the driving circuit 24. The polarity switching signal is outputted by the timing generating block 15. For assuring servo stability, it is advisable to use the timing from the address extraction circuit 101. Instead of managed roughly grasped timing, reproduction end timing of the address section ADR2 is actually precisely obtained in the extraction circuit 101. Thus, polarity switching is done immediately after the end of the reproduction of the address section ADR2. Similarly, the polarity reversion may be done immediately after the end of the reproduction of the address section ADR1.

In the disc-shaped information recording medium in which the land and the groove are switched with each other on the same track and the address section is arrayed at the switching position, it is unnecessary to revert the polarity immediately after the end of reproduction of the address section ADR1, so that the polarity is kept unchanged.

If, in the disc-shaped information recording medium in which the synchronization signals $AM_{odd}$ and $AM_{even}$ in the address sections ADR1 and ADR2 are of patterns different from each other, data recording/reproduction is performed on the land, the address section ADR1 is employed. That is, the synchronization signal $AM_{odd}$ is first detected. The synchronization signal $AM_{odd}$ is the unique pattern for the address section ADR1 and cannot be detected in the address section ADR2. Therefore, extraction is not done in the address section ADR2. Specifically, error detection is not done therein. Therefore, if the reproduced signal is obtained in the address section ADR2, CRC=Hi does not hold such that the address information is not loaded in the address register. Ultimately, the information of the target address section ADR1 is loaded in the address register.

If data recording/reproduction is done for the groove section, the address section ADR2 is used. That is, the synchronization signal $AM_{even}$ is first detected. The synchronization signal $AM_{even}$ is the unique pattern for the address section ADR2 and cannot be detected in the address section ADR1. Therefore, extraction is not done in the address section ADR1. Specifically, error detection is not done therein. Therefore, if the reproduced signal is obtained in the address section ADR1, CRC=Hi does not hold such that the address information is not loaded in the address register. Ultimately, the information of the target address section ADR2 is loaded in the address register.

If a current track position is desired to be known during a time other than the time of recording/reproduction, such as before seeking, if rough position, such as the track reached after seeking, is desired to be known, or if the position is desired to be known at any rate if tracking is or is not taken, it suffices if both the address sections ADR1 and ADR2 are read, instead of reading one of the address sections ADR1 and ADR2. That is, it suffices if the synchronization signals $AM_{odd}$ and $AM_{even}$ are detected.

The address sections ADR1, ADR2 may also be recorded with a shift of one-half track pitch with respect to the grooves and lands.

What is claimed is:

1. An optical disc having a land and a groove, in which information is recorded and/or reproduced on or from a track on said land and said groove, comprising:

an address section having a first address subsection and a second address subsection each including address information data previously formed at a pre-set period on said track and a third address subsection including VFO information data, and wherein data of said third address subsection is recorded continuously with data of said first address subsection, said address information data being arranged in a radial direction with first and second address subsections relatively offset in a track direction; and a data section including at least one of continuous land and continuous groove for recording data.

2. The optical disc of claim 1, wherein said third address subsection further includes AM data.

3. The optical disk of claim 1, wherein said first address subsection further includes AM data.

4. The optical disc of claim 1, wherein said first address subsection and said third address subsection are adjacent on said disc and overlapping in a track direction.

5. The optical disc of claim 1, wherein said first address subsection and said second address subsection are adjacent on said disc and non-overlapping in a track direction.

6. The optical disc of claim 1, wherein said first address subsection and said second address subsection are separated by said data section.

* * * * *